United States Patent
Clark et al.

(10) Patent No.: US 12,451,151 B2
(45) Date of Patent: Oct. 21, 2025

(54) TONE FRAME DETECTOR FOR DIGITAL SPEECH

(71) Applicant: Digital Voice Systems, Inc., Westford, MA (US)

(72) Inventors: Thomas Clark, Westford, MA (US); John C. Hardwick, Acton, MA (US)

(73) Assignee: Digital Voice Systems, Inc., Westford, MA (US)

( * ) Notice: Subject to any disclaimer, the term of this patent is extended or adjusted under 35 U.S.C. 154(b) by 67 days.

(21) Appl. No.: 17/716,845

(22) Filed: Apr. 8, 2022

(65) Prior Publication Data

US 2023/0326473 A1    Oct. 12, 2023

(51) Int. Cl.
| | |
|---|---|
| G10L 19/16 | (2013.01) |
| G06F 16/683 | (2019.01) |
| G10L 19/005 | (2013.01) |
| H04W 88/18 | (2009.01) |

(52) U.S. Cl.
CPC .......... *G10L 19/167* (2013.01); *G06F 16/683* (2019.01); *G10L 19/005* (2013.01); *H04W 88/181* (2013.01)

(58) Field of Classification Search
None
See application file for complete search history.

(56) References Cited

U.S. PATENT DOCUMENTS

| | | | |
|---|---|---|---|
| 3,622,704 A | 11/1971 | Ferrieu et al. | |
| 3,903,366 A | 9/1975 | Coulter | |
| 4,847,905 A | 7/1989 | Lefevre et al. | |
| 4,932,061 A | 6/1990 | Kroon et al. | |
| 4,944,013 A | 7/1990 | Gouvianakis et al. | |
| 5,081,681 A | 1/1992 | Hardwick et al. | |
| 5,086,475 A | 2/1992 | Kutaragi et al. | |

(Continued)

FOREIGN PATENT DOCUMENTS

| | | |
|---|---|---|
| EP | 0893791 A2 | 1/1999 |
| EP | 1020848 A2 | 7/2000 |

(Continued)

OTHER PUBLICATIONS

International Search Report and Written Opinion in International Application No. PCT/US2021/012608, mailed on Mar. 31, 2021, 9 pages.

(Continued)

*Primary Examiner* — Douglas Godbold
(74) *Attorney, Agent, or Firm* — Fish & Richardson P.C.

(57) ABSTRACT

Tone data embedded in a voice bit stream that includes frames of non-tone bits and frames of tone bits is detected and extracted by selecting a frame of bits, analyzing the selected frame of bits to determine whether it is a frame of tone bits, and, when it is a frame of tone bits, extracting tone data from it. Analyzing the selected frame includes comparing bits of the selected frame to sets of tone data to produce error criteria representative of differences between the selected frame and each of multiple sets of tone data. Based on the error criteria, a set of tone data that most closely corresponds to the bits of the selected frame is selected. When the error criteria corresponding to the selected set of tone data satisfies a set of thresholds, the selected frame is designated as a frame of tone bits.

26 Claims, 7 Drawing Sheets

(56) References Cited

U.S. PATENT DOCUMENTS

| | | |
|---|---|---|
| 5,193,140 A | 3/1993 | Minde |
| 5,195,166 A | 3/1993 | Hardwick et al. |
| 5,216,747 A | 6/1993 | Hardwick et al. |
| 5,226,084 A | 7/1993 | Hardwick et al. |
| 5,226,108 A | 7/1993 | Hardwick et al. |
| 5,247,579 A | 9/1993 | Hardwick et al. |
| 5,351,338 A | 9/1994 | Wigren et al. |
| 5,491,772 A | 2/1996 | Hardwick et al. |
| 5,517,511 A | 5/1996 | Hardwick et al. |
| 5,581,656 A | 12/1996 | Hardwick et al. |
| 5,630,011 A | 5/1997 | Lim et al. |
| 5,649,050 A | 7/1997 | Hardwick et al. |
| 5,657,168 A | 8/1997 | Maruyama et al. |
| 5,664,051 A | 9/1997 | Hardwick et al. |
| 5,664,052 A | 9/1997 | Nishiguchi et al. |
| 5,696,874 A | 12/1997 | Taguchi |
| 5,701,390 A | 12/1997 | Griffin et al. |
| 5,715,365 A | 2/1998 | Griffin et al. |
| 5,742,930 A | 4/1998 | Howitt |
| 5,754,974 A | 5/1998 | Griffin et al. |
| 5,826,222 A | 10/1998 | Griffin |
| 5,870,405 A | 2/1999 | Hardwick |
| 5,937,376 A | 8/1999 | Minde |
| 5,963,896 A | 10/1999 | Ozawa |
| 6,018,706 A | 1/2000 | Huang et al. |
| 6,064,955 A | 5/2000 | Huang et al. |
| 6,131,084 A | 10/2000 | Hardwick |
| 6,161,089 A | 12/2000 | Hardwick |
| 6,199,037 B1 | 3/2001 | Hardwick |
| 6,377,916 B1 | 4/2002 | Hardwick |
| 6,484,139 B2 | 11/2002 | Yajima |
| 6,502,069 B1 | 12/2002 | Grill et al. |
| 6,526,376 B1 | 2/2003 | Villette et al. |
| 6,574,334 B1* | 6/2003 | Bartkowiak .......... H04M 1/738 370/526 |
| 6,574,593 B1 | 6/2003 | Gao et al. |
| 6,675,148 B2 | 1/2004 | Hardwick |
| 6,895,373 B2 | 5/2005 | Garcia et al. |
| 6,912,495 B2 | 6/2005 | Griffin et al. |
| 6,931,373 B1 | 8/2005 | Bhaskar et al. |
| 6,954,726 B2 | 10/2005 | Brandel et al. |
| 6,963,833 B1 | 11/2005 | Singhal |
| 7,016,831 B2 | 3/2006 | Suzuki et al. |
| 7,171,156 B2 | 1/2007 | Caffrey et al. |
| 7,289,952 B2 | 10/2007 | Yasunaga et al. |
| 7,310,596 B2 | 12/2007 | Ota et al. |
| 7,394,833 B2 | 7/2008 | Heikkinen et al. |
| 7,421,388 B2 | 9/2008 | Zinser et al. |
| 7,430,507 B2 | 9/2008 | Zinser et al. |
| 7,519,530 B2 | 4/2009 | Kaajas et al. |
| 7,529,660 B2 | 5/2009 | Bessette et al. |
| 7,529,662 B2 | 5/2009 | Zinser et al. |
| 7,634,399 B2 | 12/2009 | Hardwick |
| 7,957,963 B2 | 6/2011 | Hardwick |
| 7,970,606 B2 | 6/2011 | Hardwick |
| 8,050,397 B1* | 11/2011 | Read .................... H04Q 1/457 379/283 |
| 8,200,497 B2 | 6/2012 | Hardwick |
| 8,315,860 B2 | 11/2012 | Hardwick |
| 8,340,973 B2 | 12/2012 | Tsuchinaga et al. |
| 8,359,197 B2 | 1/2013 | Hardwick |
| 8,595,002 B2 | 11/2013 | Hardwick |
| 9,232,376 B2 | 1/2016 | Senese et al. |
| 2002/0038210 A1 | 3/2002 | Yajima et al. |
| 2003/0135374 A1 | 7/2003 | Hardwick |
| 2003/0154073 A1 | 8/2003 | Ota et al. |
| 2004/0002856 A1* | 1/2004 | Bhaskar ................ G10L 19/097 704/219 |
| 2004/0093206 A1* | 5/2004 | Hardwick ............. G10L 19/087 704/221 |
| 2004/0117178 A1 | 6/2004 | Ozawa |
| 2004/0153316 A1* | 8/2004 | Hardwick ............. G10L 19/173 704/214 |
| 2004/0174984 A1* | 9/2004 | Jabri ...................... H04Q 1/46 379/386 |
| 2004/0253925 A1 | 12/2004 | Caffrey et al. |
| 2004/0260544 A1* | 12/2004 | Kikumoto ........... G10L 19/0204 704/E19.018 |
| 2005/0278169 A1* | 12/2005 | Hardwick ............. G10L 19/005 704/223 |
| 2005/0281289 A1 | 12/2005 | Huang et al. |
| 2010/0086140 A1 | 4/2010 | Chen et al. |
| 2010/0088089 A1 | 4/2010 | Hardwick |
| 2010/0094620 A1 | 4/2010 | Hardwick |
| 2011/0208514 A1 | 8/2011 | Tsuchinaga et al. |
| 2011/0257965 A1 | 10/2011 | Hardwick |
| 2014/0029733 A1* | 1/2014 | Smith .................... G10L 15/00 704/E15.001 |
| 2014/0236587 A1* | 8/2014 | Subasingha ............ G10L 19/24 704/219 |
| 2017/0325049 A1 | 11/2017 | Mallick et al. |
| 2021/0210106 A1 | 7/2021 | Clark |
| 2021/0366498 A1 | 11/2021 | Tomasek et al. |
| 2023/0043682 A1 | 2/2023 | Hardwick |
| 2023/0144613 A1 | 5/2023 | Mauch et al. |

FOREIGN PATENT DOCUMENTS

| | | |
|---|---|---|
| EP | 1237284 A1 | 9/2002 |
| JP | H 05346797 A | 12/1993 |
| JP | H 09-81199 A | 3/1997 |
| JP | H 10293600 A | 11/1998 |
| WO | WO 1998004046 A2 | 1/1998 |
| WO | WO 2007042350 A2 | 4/2007 |

OTHER PUBLICATIONS

International Search Report and Written Opinion in International Appln. No. PCT/US2022/074176, mailed on Nov. 18, 2022, 11 pages.

Mears, "High-speed error correcting encoder/decoder," IBM Technical Disclosure Bulletin USA, Oct. 1980, 23(4):2135-2136.

Shoham, "High-quality speech coding at 2.4 to 4.0 kbit/s based on time-frequency interpolation," Presented at IEEE International Conference on Acoustics, Speech, and Signal Processing, Minneapolis, MN, USA, Apr. 30, 1993, pp. II-167-II-170.

International Search Report and Written Opinion in International Application No. PCT/US23/17755, mailed on Jul. 18, 2023, 12 pages.

Extended European Search Report in European Appln. 23785395.7, mailed on May 22, 2025, 9 pages.

\* cited by examiner

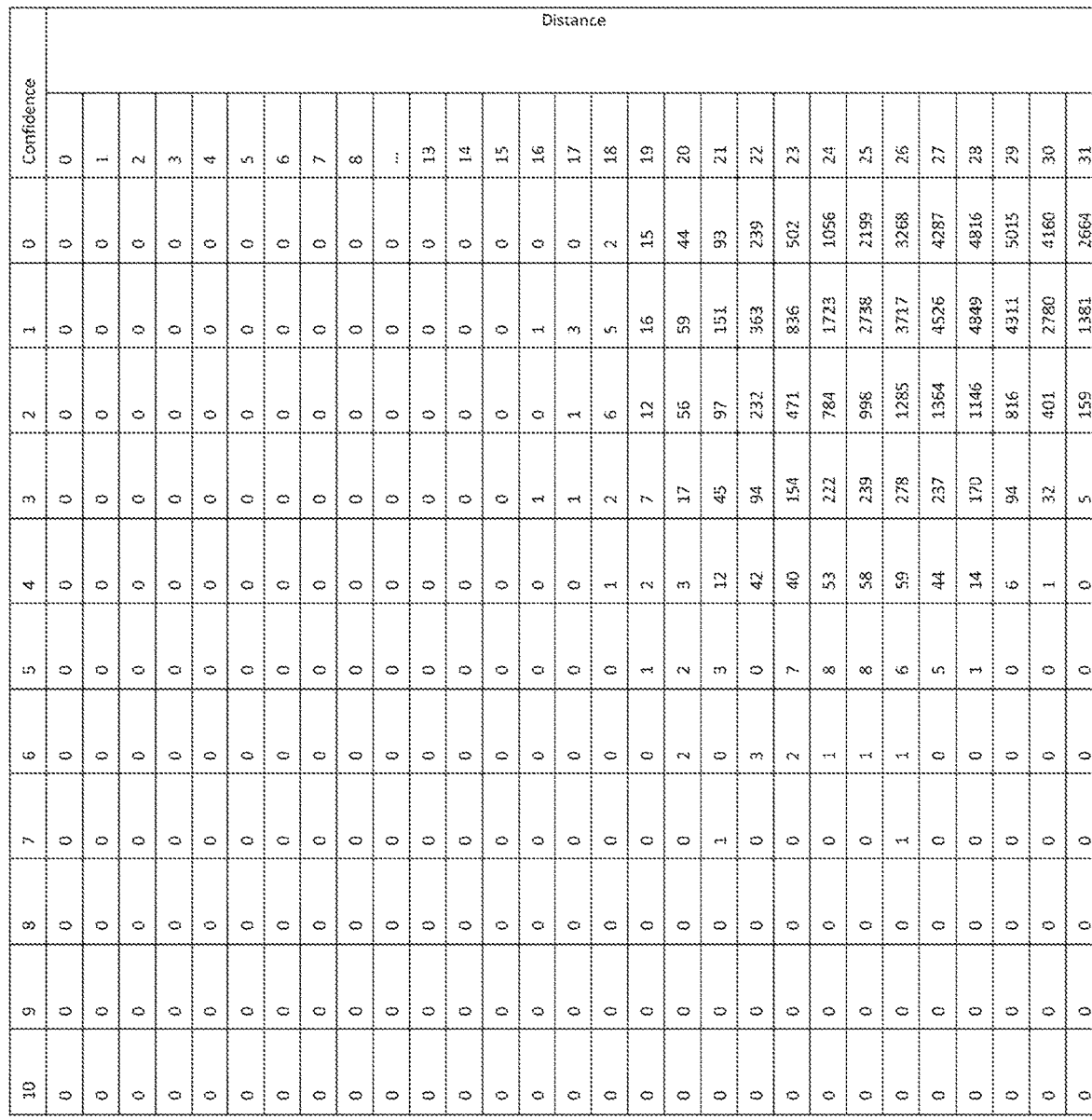
Fig. 5: Distance vs Confidence Histogram for Voice Frame Input

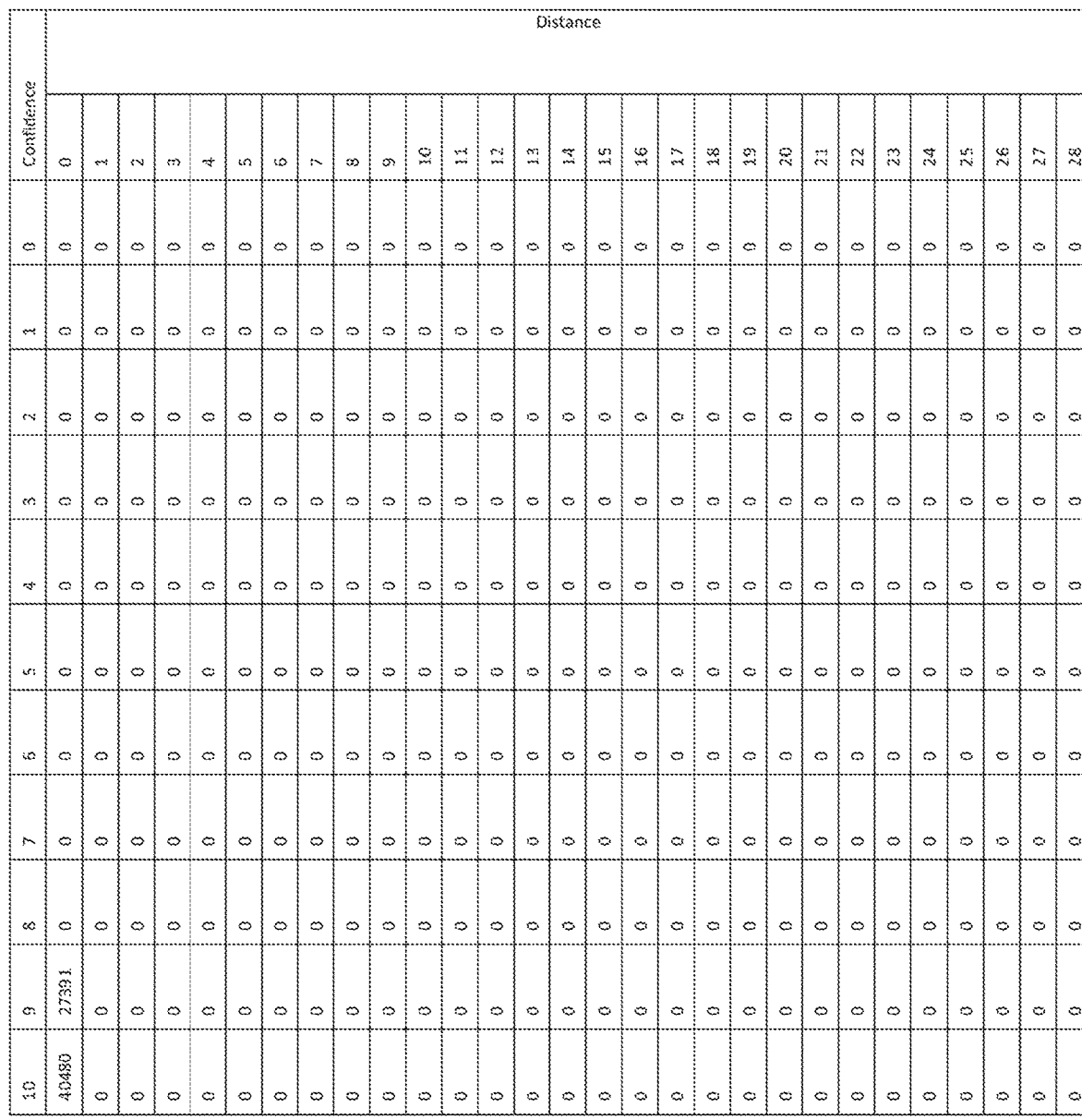
Fig. 6: Distance vs Confidence Histogram for Tone Frame Input

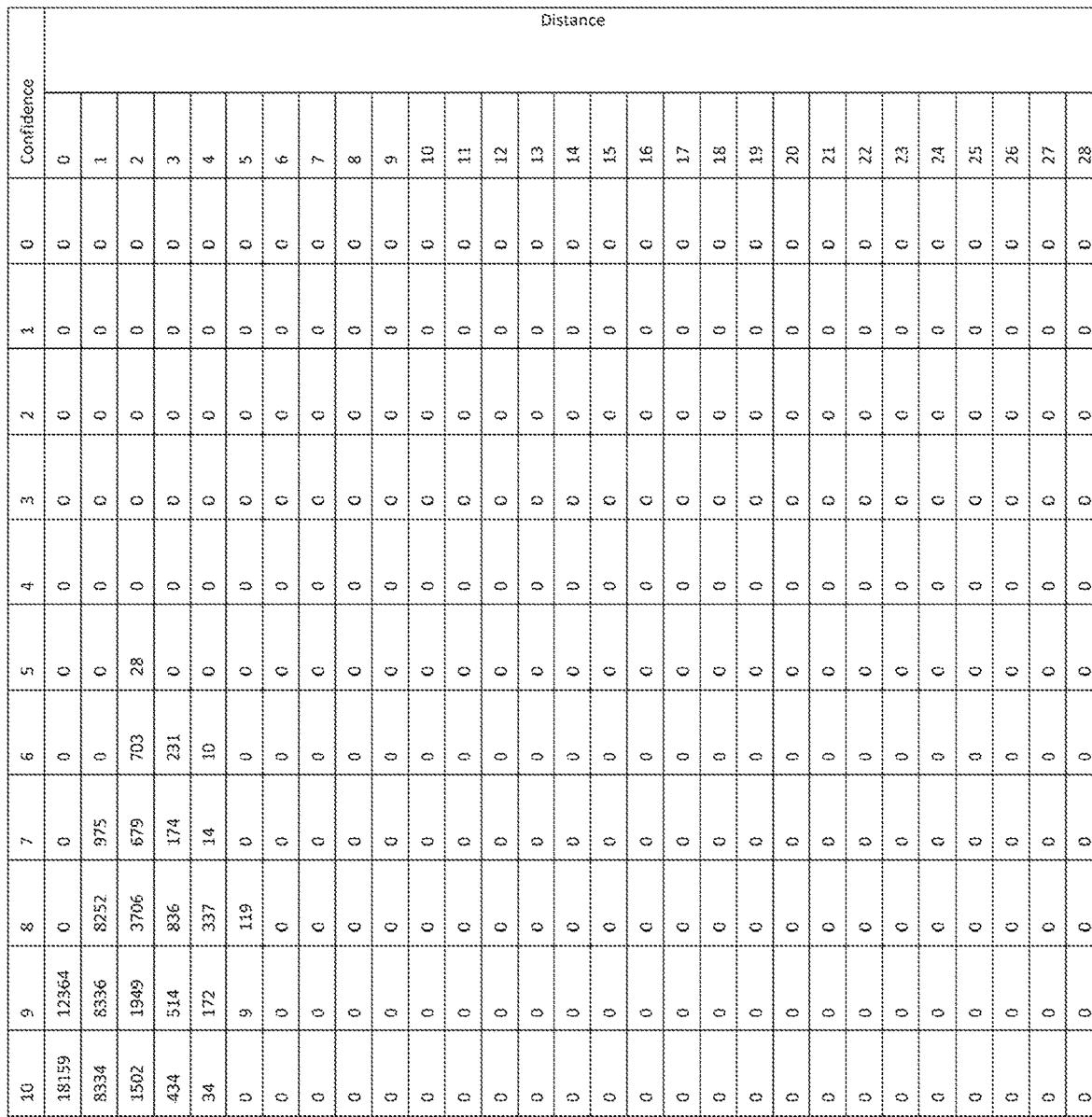
Fig. 7: Distance vs Confidence Histogram for Tone Frame Input 1% BER

TONE FRAME DETECTOR FOR DIGITAL SPEECH

TECHNICAL FIELD

This description relates generally to processing of digital speech.

BACKGROUND

Modern voice communications such as mobile radio and cellular telephony transmit voice as digital data, and in many cases where transmission bandwidth is limited, the voice data is compressed by a vocoder to reduce the data that must be transmitted. Similarly, voice recording and storage applications may also use digital voice data with a vocoder to reduce the amount of data that must be stored per unit time. In either case, the analog voice signal from a microphone is converted into a digital waveform using an Analog-to-Digital converter to produce a sequence of voice samples. In traditional telephony applications, speech is limited to 3-4 kHz of bandwidth and a sample rate of 8 kHz is used. In higher bandwidth applications, a corresponding higher sampling rate (such as 16 kHz or 32 kHz) may be used. The digital voice signal (i.e., the sequence of voice samples) is processed by the vocoder to reduce the overall amount of voice data. For example, a voice signal that is sampled at 8 kHz with 16 bits per sample results in a total voice data rate of $8,000 \times 16 = 128,000$ bits per second (bps), and a vocoder can be used to reduce the bit rate of this voice signal to rates of 2,000-8,000 bps (i.e., where 2,000 bps is a compression ratio of 64 and 8000 bps is a compression rate of 16) being achievable while still maintaining reasonable voice quality and intelligibility. Such large compression ratios are due to the large amount of redundancy within the voice signal and the inability of the ear to discern certain types of distortion. The result is that the vocoder forms a vital part of most modern voice communications systems where the reduction in data rate conserves precious RF spectrum and provides economic benefits to both service providers and users.

Vocoders are employed by digital mobile radio systems including P25, dPMR, DMR, and TETRA, where a low bit rate vocoder, typically operating between 2-5 kbps, is used. For example, in P25 radio systems, a dual-rate vocoder operating at 2450 or 4400 bps (not including error control bits) is used, while in DMR the vocoder operates at 2450 bps. In these and other radio systems, the vocoder is based on the Multiband Excitation (MBE) speech model and variants include the IMBE, AMBE and AMBE+2 vocoders. TIA standard document 102BABA including the Half Rate Vocoder Annex describes a dual rate vocoder used in P25. While newer versions of this vocoder containing various additional features and enhancements have been developed and are in use in newer radio equipment, the IMBE vocoder described in TIA 102BABA is illustrative of the type of vocoder used in the systems described below. Other details of MBE vocoders are discussed in U.S. Pat. No. 7,970,606 ("Interoperable Vocoder") and U.S. Pat. No. 8,359,197 ("Half-rate Vocoder"), both of which are incorporated by reference.

A vocoder is divided into two primary functions: (i) an encoder that converts an input sequence of voice samples into a low-rate voice bit stream; and (ii) a decoder that reverses the encoding process and converts the low-rate voice bit stream back into a sequence of voice samples that are suitable for playback via a digital-to-analog converter and a loudspeaker.

SUMMARY

Techniques are provided for detecting tone frames in a voice bit stream of, for example, a P25, DMR, dPMR, NXDN or other digital mobile radio system. The techniques permit improved detection and extraction of tone or other non-voice data when faced with degraded channel conditions.

In one general aspect, a method for detecting and extracting tone data or other non-voice data embedded in a voice bit stream that includes frames of bits, with some of the frames of bits being frames of non-tone bits and some of the frames of bits being frames of tone bits, includes selecting a frame of bits from the voice bit stream; analyzing the selected frame of bits to determine whether the selected frame of bits is a frame of tone bits; and, when the selected frame of bits is a frame of tone bits, extracting tone data from the selected frame of bits. Analyzing the selected frame of bits includes comparing bits of the selected frame of bits to sets of tone data to produce error criteria representative of differences between the selected frame of bits and each of multiple sets of tone data. Based on the error criteria, a set of tone data is selected that most closely corresponds to the bits of the selected frame of bits. When the error criteria corresponding to the selected set of tone data satisfies a set of thresholds, the selected frame of bits is designated as a frame of tone bits. Extracting tone data from the selected frame of bits includes providing the selected set of tone data as the extracted tone data.

Implementations may include one or more of the following features. For example, the method may include repeating the selecting and analyzing steps for each frame of bits from the voice stream, and performing the extracting step for each frame of bits determined to be a frame of tone bits.

Analyzing the selected frame of bits may include comparing bits of the selected frame of bits to every permitted set of tone data or to only a subset of every permitted set of tone data. For example, a set of tone data may include an amplitude component and an index component, and analyzing the selected frame of bits may include comparing bits of the selected frame of bits corresponding to amplitude to all permitted amplitude components of the multiple sets of tone data, selecting a subset of the all permitted amplitude components that most closely correspond to the selected frame of bits, and producing error criteria by comparing bits of the selected frame of bits to all permitted combinations of the selected subset of permitted amplitude components and permitted index components. The index component may include repetitions of a tone index.

The voice bit stream may be generated by a MBE vocoder. The frames of non-tone bits may include one or more of voice frames, silence frames, and data frames.

In another general aspect, a method for detecting and extracting non-voice data embedded in a voice bit stream that includes frames of bits, with some of the frames of bits being frames of voice bits and some of the frames of bits being frames of non-voice bits, includes selecting a frame of bits from the voice bit stream, analyzing the selected frame of bits to determine whether the selected frame of bits is a frame of non-voice bits, and, when the selected frame of bits is a frame of non-voice bits, extracting non-voice data from the selected frame of bits. Analyzing the selected frame of bits includes comparing bits of the selected frame of bits to sets of non-voice data to produce error criteria representative of differences between the selected frame of bits and each of multiple sets of non-voice data, and based on the error criteria, selecting a set of non-voice data that most closely corresponds to the bits of the selected frame of bits. When the error criteria corresponding to the selected set of non-voice data satisfies a set of thresholds, the selected frame of bits is designated as a frame of non-voice bits. Extracting non-voice data from the selected frame of bits includes providing the selected set of non-voice data as the extracted non-voice data.

Implementations may include one or more of the features discussed above.

The techniques for tone frame and non-voice data detection discussed above and described in more detail below may be implemented by a speech decoder. The speech decoder may be included in, for example, a handset, a mobile radio, a base station or a console.

Other features will be apparent from the following description, including the drawings, and the claims.

DESCRIPTION OF DRAWINGS

FIGS. 5-7 are charts illustrating distance and confidence measures for test data sets.

DETAILED DESCRIPTION

Figure 1:
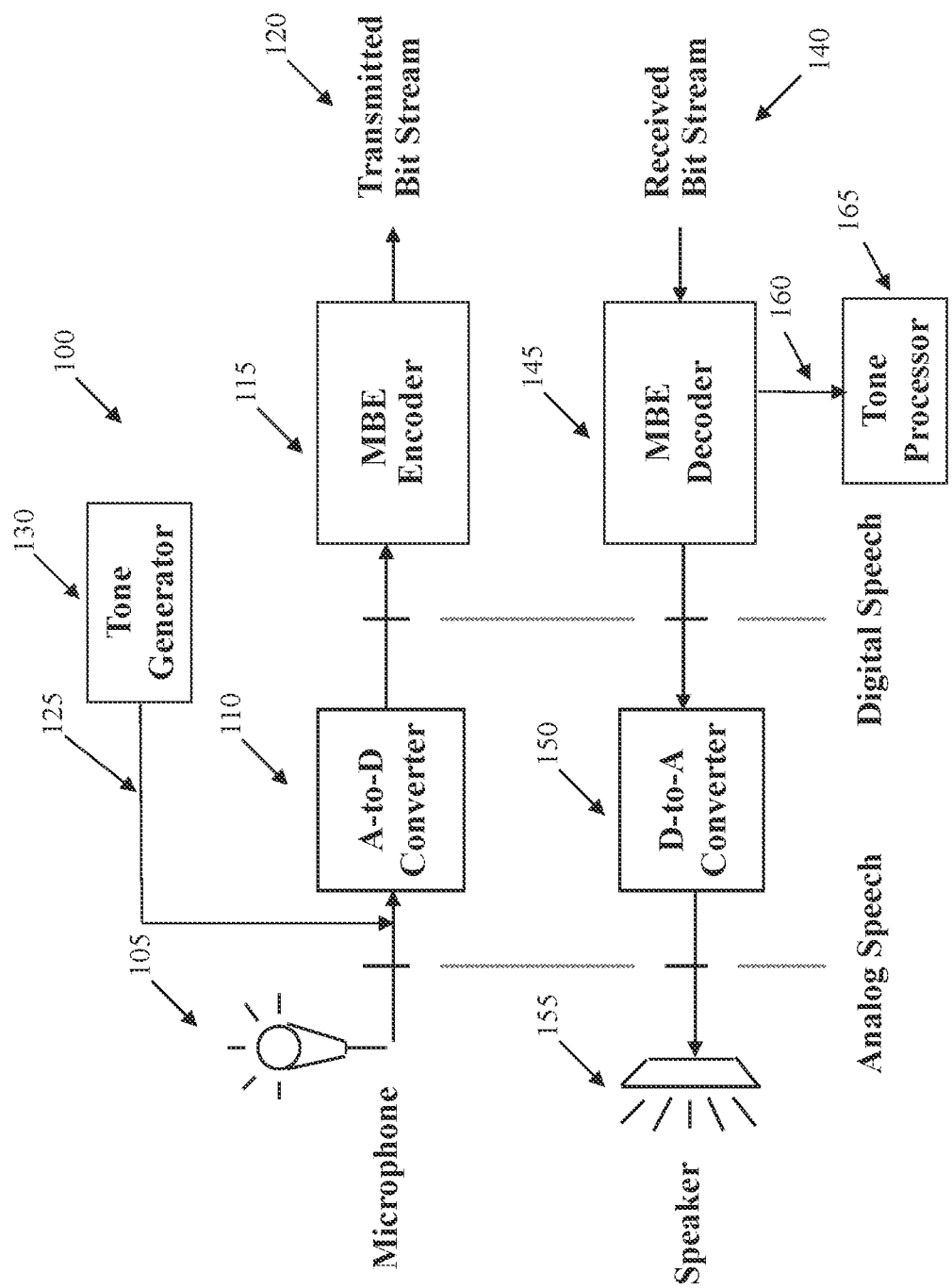
FIG. 1 is a block diagram of a MBE vocoder.

A tone frame detector may be used to detect and decode tone frames within a bit stream that may contain tone frames as well as a mixture of other frame types, including voice frames, silence frames and data frames. The tone frame detector is tolerant of degraded channel conditions such that tones may be transmitted and detected on a channel having conditions so poor that voice data cannot be reliably conveyed across the channel. Improved tone reception is beneficial since DTMF tones, Knox tones, call progress tones and single frequency tones are commonly used within a communication system for signaling purposes.

Typically, transmitted tone frames have greater redundancy than other types of frames, since the information content of tones is relatively low. The redundancy may include simple bit repetition or forward error correction ("FEC"). The AMBE® vocoder encodes tone frames using an 8-bit tone index that is repeated N times and a 7-bit log amplitude. The repeated index provides redundancy. In addition, many systems add FEC to the data stream to add additional redundancy. The described tone frame detector decodes tone frames in a way that takes advantage of the redundancy provided by the repeated tone index and the FEC, if any, such that the tone frame detector can decode tones even in the presence of highly degraded channel conditions.

The tone frame detector can be used by most AMBE® vocoders that code tones using multiple repetitions of the tone index, as well as by other non-AMBER: systems that code tones using N repetitions of the index or other tone parameter. The tone frame detector can be further generalized to detect other types of non-tone data. In particular, any information that can be transmitted with extra redundancy may be detected at the decoder using the described detector in a similar fashion, such that the information can pass from the encoder to the decoder with increased reliability. For example, U.S. patent application Ser. No. 17/387,412 entitled "Reducing the Perceived Effects of Non-Voice Data in Digital Speech," which is incorporated by reference describes a method for embedding non-voice data, such as GPS location data, in a voice bit stream. This method includes inserting data frames into a voice bit stream with the inserted data frames including extra redundancy. The methods employed by the tone frame detector can be employed to detect and decode such data frames with increased reliability.

The tone information bits in AMBER vocoders include n tone index bits, which represent the frequency content of the tone (typically single-frequency and dual-frequency tones are supported), and m tone amplitude bits which convey the log amplitude of the tone. Typically, the tone index is an 8-bit value that can be used to represent up to 256 unique tones. For example, in the AMBE+2™ 3600 bps vocoder (as used in APCO P25 half-rate), there are N=154 unique tone indices, where indices 5 through 123 represent single frequency tones, indices 128 through 143 represent DTMF tones, indices 144 through 159 represent Knox tones, and indices 160 through 163 represent call progress tones. The remaining indices are not currently used, but could be used in future systems.

The tone frame detector computes a distance for each possible index/amplitude pair. If there are N possible indices and M possible amplitudes, then there are N*M index/amplitude combinations and each combination is considered a tone candidate. For each such tone candidate, there is an associated distance which may be computed using the described techniques. The tone candidate that produces the lowest distance is the most likely pair that was transmitted. For AMBE+2™ 3600 bps vocoders, N=154 and M=64, such that the maximum number of distances that need to be computed is 9856. As discussed below, the complexity of the detection can be reduced by reducing the number of distances that need to be computed.

The tone frame detector supports bits received from the channel in either hard-decision format or soft-decision format. For hard-decision format, the distance for each candidate tone is a hamming weight. For soft-decision format, the distance associated with each bit is the square of the distance between the received value and the full confidence value of the corresponding bit in the candidate tone.

The tone frame detector can be used to detect tone frames or other redundantly coded data in any communication system. One such system where the tone frame detector may be employed is the AMBE+2™ 3600 bps vocoder. The tone frame detector is described in general and particular emphasis is given to application within the AMBE+2™ 3600 bps vocoder (as used in APCO P25 half-rate). As such, APCO Project 25 Half-Rate Vocoder Addendum, TIA-102.BABA-1, is incorporated by reference. The tone frame detector may be used within a system that transmits data (such as location or other non-voice data) in addition to voice, silence and tones.

FIG. 1 shows a speech coder or vocoder system 100 that samples analog speech or some other signal from a microphone 105. In addition to analog speech, the sampled analog signal may include tones. An analog-to-digital ("A-to-D") converter 110 digitizes the sampled speech to produce a digital speech signal. The digital speech is processed by a MBE speech encoder unit 115 to produce a digital bit stream 120 suitable for transmission or storage. The speech encoder processes the digital speech signal in short frames. Each frame of digital speech samples produces a corresponding frame of bits in the bit stream output of the encoder. The A-to-D converter also may receive tone data 125 generated by a tone generator 130 included in a device, such as a phone or radio, that includes the MBE encoder 115. Some speech encoders may provide mechanisms, such as by using a keypad, for injecting tones directly and bypassing the A-to-D converter 110. When this is the case, the tone information is passed to the encoder by using amplitude and index parameters and the corresponding tone frame is produced by the encoder without a tone signal being required in the digital speech signal.

FIG. 1 also depicts a received bit stream 140 entering a MBE speech decoder unit 145 that processes each frame of bits to produce a corresponding frame of synthesized speech samples. A digital-to-analog ("D-to-A") converter unit 150 then converts the digital speech samples to an analog signal that can be passed to a speaker unit 155 for conversion into an acoustic signal suitable for human listening. The MBE decoder 145 also may provide tone data 160 to a tone processor 165 that makes use of the tone data. In other configurations, the tone processor 165 may receive tone data from the output of the D-to-A converter 150 or the output of the speaker unit 155.

Figure 2:
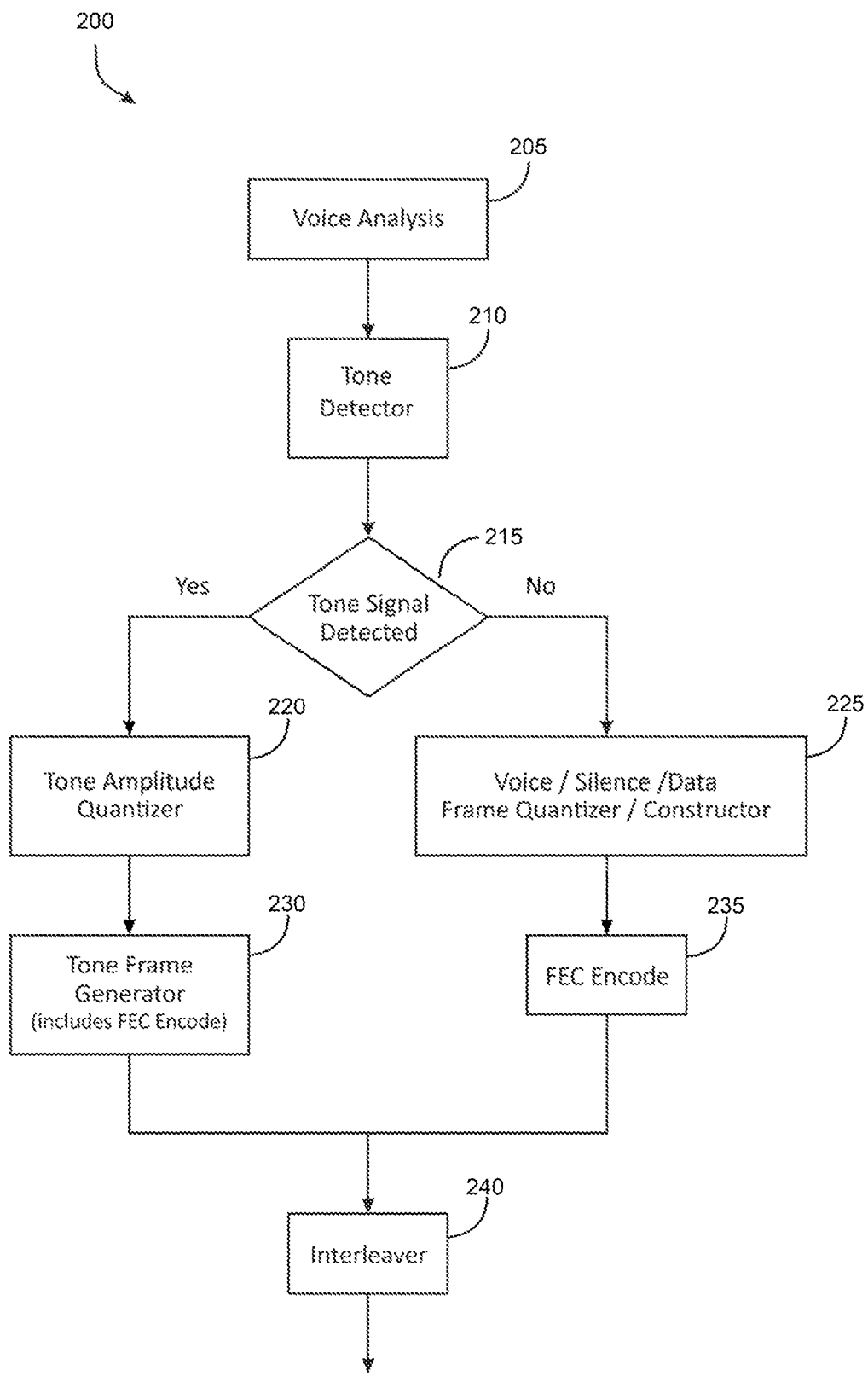
FIG. 2 is a flow chart of an encoding process.

Referring to FIG. 2, an encoder, such as the MBE encoder 115, operates according to a process 200. The encoder employs voice analysis 205 to convert an incoming speech signal into MBE model parameters. The encoder then employs tone detector 210, which can detect the presence of various tone signals. When a tone signal is detected (215), the encoder employs a tone amplitude quantizer 220 and a tone frame generator 230 to produce a tone frame code vector containing the tone information which has been coded to increase redundancy. The tone frame generator 230 may employ FEC encoding to add further redundancy to the tone frame code vector.

If a tone signal was not detected (215), then a voice/silence/data frame quantizer/constructor 225 is used to produce a voice, silence, or data frame. After the encoder produces the correct frame type, an FEC encoder 235 may be used to add redundancy to the frame in order to facilitate error correction within the decoder.

Next, an interleaver 240 is used to disperse error bursts when transmitting the tone frame code vector or the encoded frame in a transmitted bit stream such as the bit stream 120.

Figure 3:
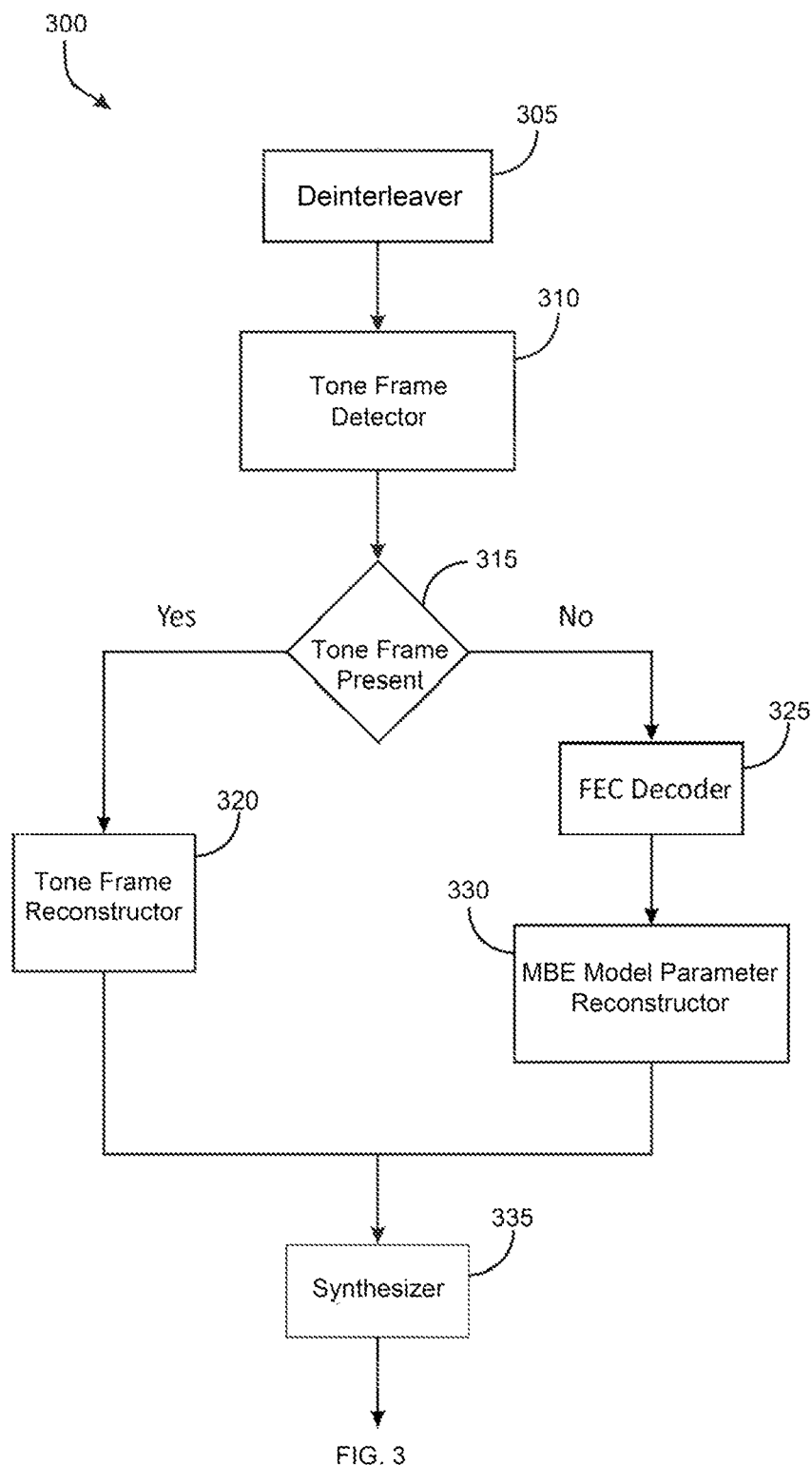
FIG. 3 is a flow chart of a decoding process.

Referring to FIG. 3, a decoder, such as the MBE decoder 145, operates according to a process 300. The decoder, which employs tone frame detection, is used in a system where tone frames are coded along with other types of frames such a voice frames, silence frames or data frames. The decoder employs tone frame detection to distinguish tone frames from other types of frames.

Initially, upon receiving a bit stream, such as the bit stream 140, the decoder employs a deinterleaver 305 to reverse the effects of the interleaver 240 on a received frame of bits. Next, a tone frame detector 310 computes a distance and confidence for every possible tone frame that might be received and analyzes these distances and confidences to determine if a tone frame is present (315). In general, the tone frame detector determines that a tone frame is present if the smallest distance between the received frame of bits and a possible tone frame is beneath a threshold amount, and identifies the possible tone frame corresponding to the smallest distance as the tone frame that is present.

If a tone frame is present, the tone frame parameters (i.e., tone index and amplitude) are passed to a tone frame reconstructor 320 which generates appropriate MBE model parameters for the tone.

If a tone frame is not present, then the decoder decodes the input frame as a voice, data or silence frame by first applying a FEC decoder 325, if applicable, and then using a MBE model parameter reconstructor 330 to generate MBE model parameters from the input frame after FEC decoding.

Finally, the decoder employs a synthesizer 335 to generate a signal from the MBE model parameters.

Tone Frame Generator

The tone frame detector 310 depends heavily on the tone frame generator 230. The tone frame generator 230 is typically used within the encoder to produce a tone frame prior to transmission. The inputs to the tone frame generator are the tone index and the tone amplitude. The output is a bit vector, which represents the tone frame and contains all information needed to reconstruct the tone at the decoder. In general, the tone frame generator creates several copies of the tone index to add redundancy to the information bits, and it may also add other forms of redundancy such as Golay codes, Hamming codes, CRCs, or convolutional codes. Since the amount of information needed to represent a tone is small compared to what is needed to represent voice, more redundancy can be added to a tone frame while keeping within the total size of a voice frame. When used in combination with the tone frame detector, this additional redundancy improves performance for tone frames under poor channel conditions.

The tone frame generator is used extensively within the tone frame detector to generate the many possible candidate tone frames that could have been transmitted and compare each of the candidate bit patterns to the received bit pattern. By using the additional redundancy included in tone frames by the encoder, the tone frame detector is able to correctly decode tone frames in very degraded channel conditions (i.e., high bit error rates) where voice or silence frames could not be recovered.

The function TFG(A, I) is defined by the transmitter. The inputs are A, the tone amplitude, and I, the tone index. The function combines bit repetition and error control coding to produce an output bit vector, C, which represents the tone frame.

Tone Frame Generator for AMBE+2™ 3600 bps Vocoder

For the AMBE+2™ 3600 bps Vocoder, the function TFG(A,I) combines the input vectors to form the output vector. Tone Frame Generation is also described in APCO Project 25 Half-Rate Vocoder Addendum, TIA-102.BABA-1, which is incorporated by reference. The inputs A and I are bit vectors that contain the tone amplitude and tone index. A is the 7-bit quantized log amplitude of the tone, and I is the 8-bit tone index which defines the frequency of single tones or frequencies for dual tones. The output vector, C, contains 72 bits which represent the tone frame.

$$A = \begin{bmatrix} a_6 \\ a_5 \\ a_4 \\ a_3 \\ a_2 \\ a_1 \\ a_0 \end{bmatrix} \text{ and } I = \begin{bmatrix} i_7 \\ i_6 \\ i_5 \\ i_4 \\ i_3 \\ i_2 \\ i_1 \\ i_0 \end{bmatrix}$$

Prior to applying error correction codes, the bits from A and I are arranged into row vectors $U_0$ and $U_1$ as follows:

$U_0 = [1\ 1\ 1\ 1\ 1\ 1\ a_6\ a_5\ a_4\ a_3\ a_2\ a_1]$ $U_1 = [i_7\ i_6\ i_5\ i_4\ i_3\ i_2\ i_1\ i_0\ i_7\ i_6\ i_5\ i_4]$

Next four code vectors, $c_0$ (24 bits), $c_1$ (23 bits), $c_2$ (11 bits) and $c_3$ (14 bits), are computed as follows:

$$c_0 = U_0 \cdot G_{24,12},$$

$$c_1 = U_1 \cdot G_{23,12} + R,$$

$$c_2 = \begin{bmatrix} i_3 \\ i_2 \\ i_1 \\ i_0 \\ i_7 \\ i_6 \\ i_5 \\ i_4 \\ i_3 \\ i_2 \\ i_1 \end{bmatrix}, \quad c_3 = \begin{bmatrix} i_0 \\ i_7 \\ i_6 \\ i_5 \\ i_4 \\ i_3 \\ i_2 \\ i_1 \\ i_0 \\ a_0 \\ 0 \\ 0 \\ 0 \\ 0 \end{bmatrix}$$

Where the extended Golay generator matrix $G_{24,12}$ and the Golay generator matrix $G_{23,12}$ are defined as follows:

$$G_{24,12} = \begin{bmatrix} 1 & 0 & 0 & 0 & 0 & 0 & 0 & 0 & 0 & 0 & 0 & 0 & 1 & 1 & 0 & 0 & 0 & 1 & 1 & 1 & 0 & 1 & 0 & 1 \\ 0 & 1 & 0 & 0 & 0 & 0 & 0 & 0 & 0 & 0 & 0 & 0 & 0 & 1 & 1 & 0 & 0 & 0 & 1 & 1 & 1 & 0 & 1 & 1 \\ 0 & 0 & 1 & 0 & 0 & 0 & 0 & 0 & 0 & 0 & 0 & 0 & 1 & 1 & 1 & 1 & 0 & 1 & 1 & 0 & 1 & 0 & 0 & 0 \\ 0 & 0 & 0 & 1 & 0 & 0 & 0 & 0 & 0 & 0 & 0 & 0 & 1 & 1 & 1 & 1 & 0 & 1 & 1 & 0 & 1 & 0 & 0 & 0 \\ 0 & 0 & 0 & 0 & 1 & 0 & 0 & 0 & 0 & 0 & 0 & 0 & 1 & 1 & 1 & 1 & 0 & 1 & 1 & 0 & 1 & 0 \\ 0 & 0 & 0 & 0 & 0 & 1 & 0 & 0 & 0 & 0 & 0 & 0 & 1 & 1 & 0 & 1 & 1 & 0 & 0 & 1 & 1 & 0 & 0 & 1 \\ 0 & 0 & 0 & 0 & 0 & 0 & 1 & 0 & 0 & 0 & 0 & 0 & 1 & 1 & 0 & 1 & 1 & 0 & 0 & 1 & 1 & 0 & 1 \\ 0 & 0 & 0 & 0 & 0 & 0 & 0 & 1 & 0 & 0 & 0 & 0 & 1 & 1 & 0 & 1 & 1 & 0 & 0 & 1 & 1 & 1 \\ 0 & 0 & 0 & 0 & 0 & 0 & 0 & 0 & 1 & 0 & 0 & 0 & 1 & 1 & 0 & 1 & 1 & 1 & 0 & 0 & 0 & 1 & 1 & 0 \\ 0 & 0 & 0 & 0 & 0 & 0 & 0 & 0 & 0 & 1 & 0 & 0 & 1 & 0 & 1 & 0 & 1 & 0 & 0 & 1 & 0 & 1 & 1 & 1 \\ 0 & 0 & 0 & 0 & 0 & 0 & 0 & 0 & 0 & 0 & 1 & 0 & 1 & 0 & 0 & 1 & 0 & 0 & 1 & 1 & 1 & 1 & 1 & 0 \\ 0 & 0 & 0 & 0 & 0 & 0 & 0 & 0 & 0 & 0 & 0 & 1 & 1 & 0 & 0 & 0 & 1 & 1 & 1 & 0 & 1 & 0 & 1 & 1 \end{bmatrix}$$

$$G_{23,12} = \begin{bmatrix} 1 & 0 & 0 & 0 & 0 & 0 & 0 & 0 & 0 & 0 & 0 & 0 & 1 & 1 & 0 & 0 & 0 & 1 & 1 & 1 & 0 & 1 & 0 \\ 0 & 1 & 0 & 0 & 0 & 0 & 0 & 0 & 0 & 0 & 0 & 0 & 0 & 1 & 1 & 0 & 0 & 0 & 1 & 1 & 1 & 0 & 1 \\ 0 & 0 & 1 & 0 & 0 & 0 & 0 & 0 & 0 & 0 & 0 & 0 & 1 & 1 & 1 & 1 & 0 & 1 & 1 & 0 & 1 & 0 & 0 \\ 0 & 0 & 0 & 1 & 0 & 0 & 0 & 0 & 0 & 0 & 0 & 0 & 1 & 1 & 1 & 1 & 0 & 1 & 1 & 0 & 1 & 0 \\ 0 & 0 & 0 & 0 & 1 & 0 & 0 & 0 & 0 & 0 & 0 & 0 & 1 & 1 & 1 & 1 & 0 & 1 & 1 & 0 & 1 \\ 0 & 0 & 0 & 0 & 0 & 1 & 0 & 0 & 0 & 0 & 0 & 0 & 1 & 1 & 0 & 1 & 1 & 0 & 0 & 1 & 1 & 0 & 0 \\ 0 & 0 & 0 & 0 & 0 & 0 & 1 & 0 & 0 & 0 & 0 & 0 & 1 & 1 & 0 & 1 & 1 & 0 & 0 & 1 & 1 & 0 \\ 0 & 0 & 0 & 0 & 0 & 0 & 0 & 1 & 0 & 0 & 0 & 0 & 1 & 1 & 0 & 1 & 1 & 0 & 0 & 1 & 1 \\ 0 & 0 & 0 & 0 & 0 & 0 & 0 & 0 & 1 & 0 & 0 & 0 & 1 & 1 & 0 & 1 & 1 & 1 & 0 & 0 & 0 & 1 & 1 \\ 0 & 0 & 0 & 0 & 0 & 0 & 0 & 0 & 0 & 1 & 0 & 0 & 1 & 0 & 1 & 0 & 1 & 0 & 0 & 1 & 0 & 1 & 1 \\ 0 & 0 & 0 & 0 & 0 & 0 & 0 & 0 & 0 & 0 & 1 & 0 & 1 & 0 & 0 & 1 & 0 & 0 & 1 & 1 & 1 & 1 & 1 \\ 0 & 0 & 0 & 0 & 0 & 0 & 0 & 0 & 0 & 0 & 0 & 1 & 1 & 0 & 0 & 0 & 1 & 1 & 1 & 0 & 1 & 0 & 1 \end{bmatrix}$$

The code vectors, $c_0$, $c_1$, $c_2$ and $c_3$ contain a total of 72 bits. The modulation vector, $R$, is a sequence of 23 pseudo random bits that are seeded from the vector $U_0$. The seed, $p_0$, for the modulation vector, $R$, is computed from the individual bits in vector $U_0$ as follows $$p_0 = \sum_{n=0}^{11} 2^{n+4} \cdot u_{0,n}$$

Where the individual bits of vector $U_0$ are defined as
$U_0 = [u_{0,11} \ u_{0,10} \ u_{0,9} \ u_{0,8} \ u_{0,7} \ u_{0,6} \ u_{0,5} \ u_{0,4} \ u_{0,3} \ u_{0,2} \ u_{0,1} \ u_{0,0}]$
Next a sequence of pseudo random numbers is computed as follows:

$p_n = [173 \cdot p_{n-1} + 13849] \bmod 65536$ for $1 \leq n \leq 23$

Note that 16-bit math can be used to achieve the modulo operation above. The most significant bit of each 16-bit p is used to form the modulation vector, $R$, as follows:

$$R = \begin{bmatrix} r_0 \\ r_1 \\ \vdots \\ r_{22} \end{bmatrix}$$

where:

$$r_n = \left\lfloor \frac{p_{n+1}}{32768} \right\rfloor \text{ for } 0 \leq n < 23$$

Collectively, the code vectors are referred to as C, where $$C = \begin{bmatrix} c_0 \\ c_1 \\ c_2 \\ c_3 \end{bmatrix}$$

The code vector, C, represents the tone frame with significant redundancy.

Note that the tone detector in the AMBE+2™ 3600 bps Vocoder (also referred to the APCO Half-rate vocoder) can detect 154 different tone indices and 128 different tone amplitudes (since 7 bits are used to quantize the log amplitude of the tone). Therefore, the number of unique C vectors that can be produced by the tone frame generator for transmission is 154×128=19712. After passing through a degraded communication channel, the tone frame may have numerous errors. The tone frame detector may evaluate a distance for every possible candidate vector to decide which tone was most likely transmitted. If no candidate has a small enough distance, then the tone frame detector indicates that no tone is detected.

The code vector, C, comprised of individual vectors $c_0$, $c_1$, $c_2$ and $c_3$ is the output of the tone frame generator function, TFG(A,I). Prior to transmission, the code vectors are interleaved to disperse burst errors. Details of the interleaving method are provided in APCO Project 25 Half-Rate Vocoder Addendum. Interleaving is not considered to be part of the tone frame generator function, but rather, a subsequent processing step. A reduced complexity tone frame detector uses a shortened tone frame generator function, called $TFG_{24}(A)$, which outputs only the first code vector, $c_0$.

In general, the tone frame detector can work with any tone frame generator that adds significant redundancy to the tone information bits. The 3600 bps AMBE+2™ Vocoder used in the APCO Project 25 radio system and elsewhere utilizes 49 source bits per 20 ms frame for a 2450 bps vocoder rate, upon which 23 bits of FEC are added bringing the total number of bits per 20 ms frame to 72 and the total bit rate to 3600 bps. In general, the tone frame generator can be used for any other vocoder bit rate. The tone index bits are typically repeated enough times to use all the data bits available. The tone frame generator may be designed to ensure that it has good minimum distance properties.

Tone Frame Detection

Figure 4:
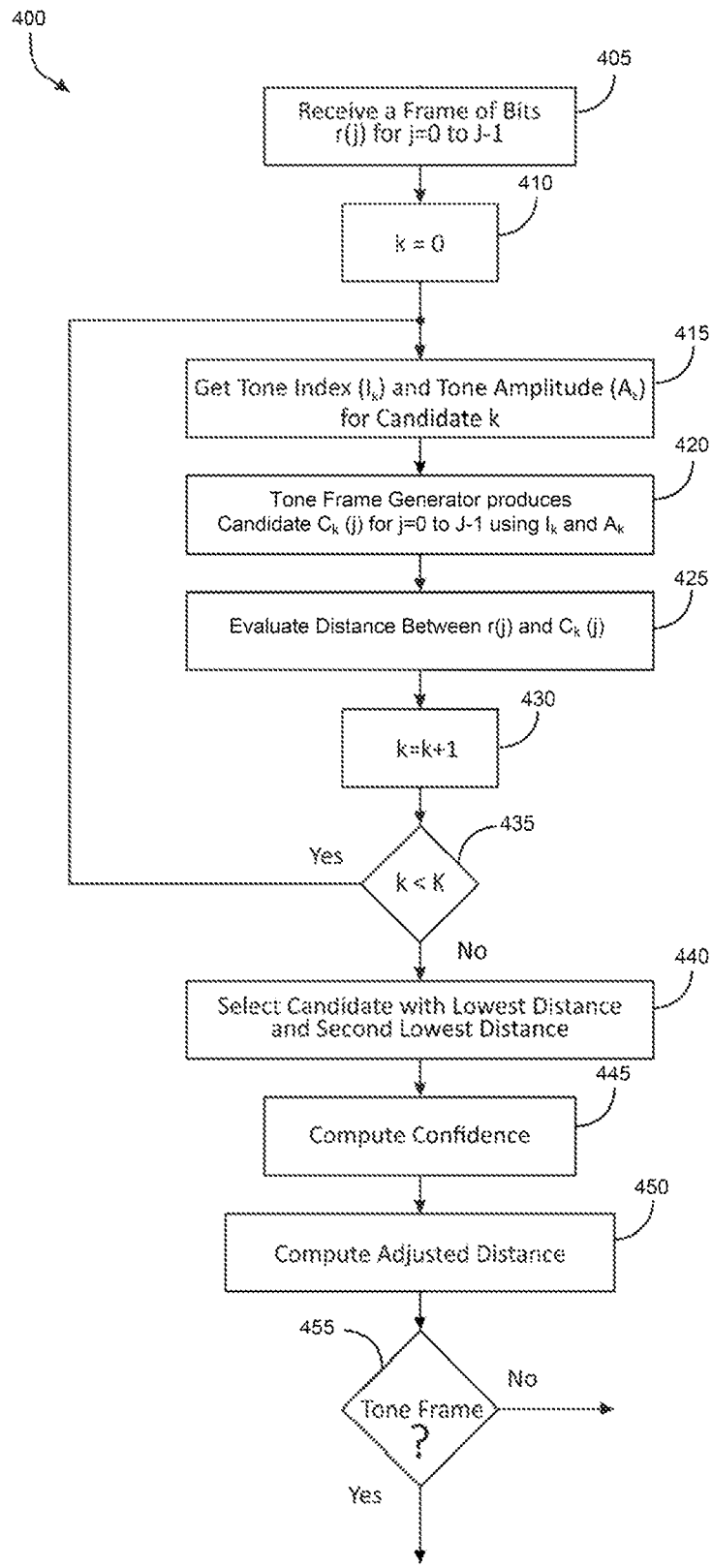
FIG. 4 is a flow chart of a tone frame detection process.

Referring to FIG. 4, one implementation of the tone frame detector 310 operates according to a process 400 to examine every frame of bits received to detect and identify tone frames. Initially, the deinterleaved frame of bits is received (step 405). The number of bits received is denoted as J, and the received bits are denoted as r(j) for j=0 to J−1. The tone frame detector will evaluate K candidate tone frames, where K is the maximum number of unique tone frames which may be transmitted by the encoder. The variable, k, is the candidate number and varies from 0 to K−1. To start the process, k is initialized to 0 (step 410) and candidate evaluation concludes when k reaches K.

For each candidate k, an associated tone index, $I_k$, and tone amplitude, $A_k$ are retrieved (step 415). The tone frame generator is used to produce the kth candidate tone frame from $I_k$ and $A_k$ in the same manner that encode produces a frame of bits representing a given tone index and tone amplitude (step 420). The kth candidate tone frame is denoted $c_k(j)$ for j=0 to J−1. The distance between r(j) and $c_k(j)$ then is evaluated (step 425).

The candidate number, k, is incremented (step 430) and, if k<K (step 435), steps 415-425 are repeated for the next candidate.

When the final candidate has been evaluated (such that k is incremented to K in step 430), the two candidates having the lowest distances are selected (step 440). The confidence is computed by subtracting the distance of the second-best candidate from the distance of the best candidate (step 445). The distance is then adjusted to help distinguish tone frames from non-tone frames (step 450). Finally, a set of decision rules is used to determine if the frame is a tone frame (step 455).

As discussed, one implementation of the tone frame detector examines the received frame of bits to see how closely it matches every possible tone frame that might have been transmitted. For each possible transmitted tone frame, a distance is computed. For bits received in hard decision format, the distance is the number of bits that would need to flip in order to match the received bits if the candidate index and amplitude were transmitted. The candidate that requires the fewest flips (or lowest distance) is taken as the most likely transmitted tone index/amplitude combination. However, if the distance is too large, the frame will be determined not to be a tone frame. When the tone frame detector does not find a tone frame, the frame is passed to the usual voice decoder, which often includes an FEC decoder.

In general, each frame of received bits may represent a tone frame. Within any valid tone frame, there are N possible values for the tone index and M possible values for the tone amplitude. In order to evaluate all possible combinations, K=N×M candidates would need to be evaluated. However, to reduce complexity, the number of candidates evaluated may be reduced, as discussed in more detail below, such that the number of candidates evaluated can be less than the maximum number of unique tones that can be transmitted by the encoder.

In many AMBE® vocoder systems, the tone amplitude is divided into a most significant portion (MSP) and a least significant portion (LSP), where the most significant portion is the only part that is protected by FEC. In these cases, the tone frame detector may exclude the amplitude LSP from the distance calculation and M may be designated as the number of unique values for the tone amplitude MSP. The LSP is excluded from the distance evaluation because it contains no redundancy and as a result is less reliable than the MSP.

For example, the AMBE+2™ 3600 bps APCO half-rate vocoder supports N=154 different tone indices and the quantized tone amplitude contains 7 bits. However, only the first 6 bits of the tone amplitude are protected by the extended Golay code. So $M=2^6=64$ possible values for the MSP of the log amplitude may be evaluated. If the tone frame detector is implemented in the APCO half-rate decoder, a total of K=9856 candidates need to be evaluated.

Distance and Confidence Calculation

If r(j) for j=0 to J−1 denotes a received frame of J bits, then the distance between the received frame of bits and any candidate frame of bits, $g_k(j)$ far j=0 to 1® 1 can be computed. The Hamming distance is simply the number of bits that are different between r(j) and g(j). A distance can be evaluated for every possible tone frame that might have been received. $g_k(j)$ is the kth tone frame candidate to be evaluated.

The distances are computed as follows:

$$d_k = \sum_{j=0}^{J-1} |r(j) - g_k(j)| \text{ for } 0 \le k < K$$

Where, $d_k$ is a hamming distance between the two bit-vectors. The distance is evaluated for each candidate. The candidate frames are obtained by passing the tone amplitude and the tone index for the kth candidate into the tone frame generator function $$g_k = TFG(A_k, I_k)$$

And each value of k can be mapped to an $A_k$, $I_k$ pair as follows:

$$A_k = \left\lfloor \frac{k}{M} \right\rfloor, I_k = k - k \cdot m_i$$

Note that $A_k$ is simply the quotient of k divided by (the number of amplitude candidates) and $I_k$ is the remainder or modulo. Any other function of k that produces all the unique combinations of A and I is also suitable.

For each possible transmitted pattern, $g_k$, the distance, $d_k$, between the received bits and the candidate pattern is evaluated. If a tone was transmitted, the lowest distance candidate is the most likely tone frame transmitted. If there were no transmission errors, then the smallest distance is 0 and there will only be one candidate with a distance of 0. If a voice or other non-tone frame was transmitted, then the method will still find the tone frame that has the smallest distance, but the distance will be significantly larger than that of a valid error-free tone frame.

The above equation for $d_k$ assumes that the bits input to the decoder are in hard-decision format, where each bit in $r(j)$ for $j=0$ to $J-1$ is a binary 0 or 1. The distance equation can be adapted to work for bits in soft-decision format as well. For soft-decision decoding, each received bit is represented by an integer within a range such that $0 \leq r(j) < 2^B$ where $2^B$ is the number of soft-decision levels. The maximum soft decision level is $L=2^B-1$. A most confident "0" bit is indicated by $r(j)=0$. A most confident "1" bit is indicated by $r(j)=L$.

For soft-decision input format, the distance equation used to evaluate each candidate becomes $$d_k = \frac{2 \sum_{j=0}^{j-1}(r(f) - g_k(j) \cdot L)^2}{L^2}$$

Whether the input format is hard-decision or soft-decision, the distance is evaluated for each of the K possible candidates. The two candidates with the lowest distance are referred to as the best candidate, and the second-best candidate, respectively. Note, that in some cases, the best candidate and the second-best candidate have equal distance. It is also possible that multiple candidates could tie for the best. To break such ties when they occur, the candidate that is closest to the prior frame is selected.

The best candidate number is referred to as $k_{best}$, and the second-best candidate number is referred to as $V_{2ndbest}$. The distances associated with the best and second-best candidates are referred to as $d_{k_{best}}$ and $d_{k_{2ndbest}}$, respectively.

The difference between the best distance and the second-best distance is known as the confidence, v.

$$v = d_{k_{2ndbest}} - d_{k_{best}}$$

v is always greater than or equal to zero, since $d_{k_{2ndbest}} \geq d_{k_{best}}$.

When a tone frame is received with no bit errors, the best distance is zero and the confidence is greater than or equal to the minimum distance, i.e., $d_{k_{best}}=0$ and $v \geq D_{step}$. In addition, when there are no bit errors, $d_{k_{2ndbest}} > D_{step}$, where $D_{step}$ is the minimum distance between any two transmitted tone frames that have different index and/or amplitude. This minimum distance between distinct tones results from the fact that a minimum number of bit flips are needed to distinguish one tone from another. If the tone frame generator adds no redundancy, then $D_{step}=1$. If the tone frame generator adds more redundancy, then the distance between distinct tones becomes larger, and $D_{step}$ increases. $D_{step}$ is a property of the tone frame generator function. For example, the tone frame generator used in the AMBE+2™ 3600 bps vocoder (as used in APCO P25 half-rate) produces a minimum distance of 9 ($D_{step}=9$). This means that any two distinct tone frames (with different index and/or amplitude) will differ at 9 or more bit positions. The ability of the tone frame detector to detect the transmitted tone degraded by bit errors is influenced by the minimum distance of the tone frame generator.

In the hard-decision case, if bits get flipped during transmission, the best distance, $d_{k_{best}}$, will likely be greater than zero and the confidence may be less than $D_{step}$. No candidate will be seen as "perfect". The minimum difference in distance between any two transmitted tones is D step, but the minimum difference in distance between two received tones can be lower if bit errors are added.

When there are no transmission errors, $v \geq D_{step}$ because the second-best candidate will be different from the best candidate by at least $D_{step}$ bits. When transmission errors occur, $0 \leq v < D_{step}$. When the separation in distance between the second-best and best candidates becomes small, there is less confidence that the best candidate is correct. If the confidence becomes 0, then the distance measure cannot tell if the best candidate or the second-best candidate is better. However, when such a tie occurs, it may be possible to break the tie by using past data, since typically tone frames are repeated for multiple consecutive frames.

Tone Frame Detector State Variables

The tone frame detector computes the following variables for each frame: $d_{k_{best}}$, $d_{k_{2ndbest}}$, v, $I_{k_{best}}$ and $A_{k_{best}}$. The tone frame detector rules may use the values for the current frame and the values from prior frames in order to decide whether a tone frame has been detected and what the index and amplitude are if a tone frame is detected. Variables $d_{k_{best}}^{(n)}$, $d_{k_{2ndbest}}^{(n)}$, $v^{(n)}$, $I_{k_{best}}^{(n)}$, and $A_{k_{best}}^{(n)}$ denote the same variables computed for the nth prior frame. So, for instance, $d_{k_{best}}^{(0)}$ denotes the value of $d_{k_{best}}$ in the current frame, $d_{k_{best}}^{(1)}$ denotes the value of $d_{k_{best}}$ in the prior frame, and $d_{k_{best}}^{(2)}$ denotes the value of $d_{k_{best}}$ two frames ago.

Adjusted Distance Calculations

After computing the distance and the confidence, the distance may optionally be adjusted. The adjustment is intended to increase the separation between the distance and confidence coordinates of voice frames from those of tone frames. In general, tone frames usually repeat the same index and have a similar amplitude for multiple frames.

The tone index which corresponds to the best candidate is $I_{k_{best}}$ and the tone amplitude is $A_{k_{best}}$. These parameters tend to have much more variation for voice inputs.

$d_{index}$ is computed as follows $$d_{index} = \begin{cases} 4\rho & \text{if } I_{k_{best}}^{(0)} \neq I_{k_{best}}^{(1)} \text{ and } I_{k_{best}}^{(0)} \neq I_{k_{best}}^{(2)} \text{ and } I_{k_{best}}^{(1)} \neq I_{k_{best}}^{(2)} \\ 0 & \text{otherwise} \end{cases}$$

Where $\rho=1$ for hard-decision decoding and $\rho=2$ for soft-decision decoding.

If each of the last 3 indices are different, then $d_{index}$ is $4\rho$, otherwise it is 0. The probability of all 3 indices being different is greater for voice frames.

$\delta_{x,y}$, as defined below, is used to compare the best amplitude found in frame x with that found in frame y $$\delta_{x,y} = \begin{cases} 1 & \text{if } |A_{k_{best}}^{(x)} - A_{k_{best}}^{(y)}| > 1 \\ 0 & \text{otherwise} \end{cases}$$

then $d_{amp}$ is computed as follows $$d_{amp} = \begin{cases} 3\rho & \text{if } \delta_{0,1} + \delta_{0,2} + \delta_{0,3} + \delta_{1,2} + \delta_{1,3} + \delta_{2,3} + 6 \\ 0 & \text{otherwise} \end{cases}$$

$d_{amp}$ is set to $3\rho$ if the best amplitude candidates for the last four frames are all different by more than 1, otherwise, $d_{amp}$ is set to 0. Because tones usually have steady amplitude, this amplitude adjustment is most likely to be 0 for tone frames.

The adjusted distance is computed by adding the above two adjustments $$d_{adjust} = d_{k_{best}} + d_{amp} + d_{index}$$

Distance and Confidence Measures

An important property of the distance and confidence measures is how they can be used to distinguish tone frames from non-tone frames. As an example, in a tone frame detector implemented within the 3600 bps AMBE-E2™ Vocoder, the 2-D histogram in FIG. 5 shows how the confidence and distance, $d_{adjust}$, vary for a typical voice input. The input used to generate this figure consisted of 67871 voice frames corresponding to approximately 22 minutes of voice. The tone frame detector computed the distance, confidence, best tone index, and best tone amplitude for each frame, then a counter was incremented for the appropriate location on the distance vs. confidence histogram shown in FIG. 5. Note that the distances for these voice frames were always >15, which indicates that the tone frame detector computes a large distance for voice frames, and the non-zero region of the histogram is referred to as the "voice zone".

In contrast, FIG. 6, shows a 2-D histogram generated in the same way for an input which consisted of 67871 tone frames without any bit errors and with the tone indices cycling through all possible tones. Since there are no bit errors, the distance is always 0. The confidence is always either 9 or 10. This indicates that the minimum distance between two distinct tone frames, $D_{step}$, is 9 for the 3600 bps AMBE+2™ Vocoder. Due to the redundancy in coded tone frames, a minimum of 9 bits must flip to get from one tone frame to another. Increasing redundancy, in general, increases the distance between distinct tones. This allows the tone to be received correctly even in the presence of bit errors.

FIG. 7 shows another histogram generated using the same input tone signals as used in FIG. 6, except that Gaussian bit errors at a rate of 1% were introduced. This results in the histogram getting "smeared." The biggest distance that occurs goes to 4 and the lowest confidence goes to 5. Approximately half of the frames still have a distance of 0 and a confidence of 9 or greater. Further analysis of the data showed that the lowest distance candidate always corresponded to the correct transmitted tone at a 1% bit error rate (i.e., the tone frame detector decoded the correct tone in all cases). By comparing FIGS. 6 and 7, the effect of introducing bit errors to tone frames can be understood. Comparing FIGS. 5 and 7 shows that tone frames, even in the presence of bit errors, can be reliably distinguished from voice frames. As shown, the distance, confidence values for voice tend to be at the upper right of the histogram, whereas the coordinates for tones are toward the lower left.

Tone Frame Detector Rules

A set of rules can be designed that allows the tone frame detector to accept tone frames that are significantly corrupted with bit errors while at the same time rejecting voice frames. The simplest way to do this would be to define thresholds for the confidence and distance. If the confidence and distance are within a certain defined region on the distance-confidence grid, then the frame is a tone frame, otherwise, it is not a tone frame.

The specific rules needed to distinguish tone frames from voice frames are highly dependent upon how the tone frame generator function is defined. The general strategy is to define rules to capture tone frames in categories. Histogram data like those shown in FIGS. 5-7 are useful in designing the rules. When distance and confidence are completely outside the ranges for voice frames, it is highly certain that a tone frame has been detected. At higher bit error rates, the best distance tends to increase and the confidence decreases. A confidence of 0 means that the best candidate and the second-best candidate had the same distance. Since there is a tie, the distance alone cannot be used to determine which candidate is the best choice. Rules can be designed such that, when the confidence is low, the frame is accepted as a tone if it has an index that matches the prior frame. This rule works well since tone frames are often repeated for multiple frames. When the best distance is low enough to determine with enough certainty that a tone frame is detected, but the confidence is low, and the tone index does not match recent history data, a rule which repeats the last tone index and amplitude may be used.

Tone Frame Detector Rules for APCO Half-Rate Decoder

In an implementation of a tone frame detector for the APCO half rate decoder, the tone frame detector outputs a Boolean, $h^{(0)}$, which indicates whether the current frame is a tone frame. When $h^{(0)}=1$, the current frame is a tone frame. When $h^{(0)}=0$, the current frame is not a tone frame. The Boolean tone frame detector state of the nth prior frame is denoted by $h^{(n)}$, where n>0. In addition, the tone frame detector outputs $I_F$ and $A_F$ which are the tone index and amplitude in ease a tone was detected.

The tone frame detector first compares the adjusted distance and confidence thresholds designed to distinguish frames that have low distance and high confidence. To simplify the notation, $I_{k_{best}}$ and $A_{k_{best}}$ are referred to simply as I and A.

if $d_{adjust} < D_{STRONG-TONE}$ and $v > V_{STRONG-TONE}$ then
$\{I_F = I^{(0)}, A_F = A^{(0)} h^{(0)} = 1\}$ For hard-decision decoding, the thresholds $D_{STRONG-TONE}$ and $V_{STRONG-TONE}$ are set to 14 and 4, respectively. For soft-decision decoding, the thresholds are set to 24 and 6. If the tone frame detector detects a tone frame, the tone frame detector ends immediately. Otherwise, the tone frame detector continues to the next rule. This first rule will catch all tone frames received with no bit errors and most tone frames received at low bit error rates. It is also designed to not allow any voice frames to be falsely detected as tones.

If the prior rule failed, then a rule that relaxes the distance threshold if there has been a tone frame detected in the prior three frames is tested:

if $d_{adjust} < D_{WEAK-TONE}$ and $v > V_{WEAK-TONE}$ then $\{h^{(1)} = 1$ or $h^{(2)} = 1$ or $h^{(3)} = 1\}$ $\{I_F = I^{(0)}, A_F = A^{(0)} h^{(0)} = 1\}$ For hard-decision decoding, the thresholds $D_{WEAK-TONE}$ and $V_{WEAK-TONE}$ are set to 17 and 4, respectively. For soft-decision decoding, the thresholds are set to 31 and 6. If the rule is satisfied, then a tone frame is detected and the tone frame detector is complete.

If neither of the above rules found a tone, then a final set of rules is applied to accept certain frames that have a low distance or a low confidence, if other conditions are met. Prior to testing the last set of rules, $V_0$ and $V_1$ are computed. They are the total confidence of the best and second-best candidate over the past 3 frames and are defined as follows.

$$e_n = \begin{cases} 1 & \text{if } I^{(0)} = I^{(n)} \\ 0 & \text{otherwise} \end{cases} \text{ for } 0 \le n < 3$$

-continued $$f_n = \begin{cases} 1 & \text{if } I^{(1)} = I^{(n)} \\ 0 & \text{otherwise} \end{cases} \text{ for } 0 \leq n < 3$$

$$V_0 = \sum_{n=0}^{2} v^{(n)} e_n$$

$$V_1 = \sum_{n=0}^{2} v^{(n)} f_n$$

Next, the following set of rules are applied to determine if the frame is a tone frame:

if $d_{adjust} < D_{LOWCONF-TONE}$ and { $h^{(1)} = 1$ or $h^{(2)} = 1$ or $h^{(3)} = 1$ } then
  if $A^{(0)} \neq$ if $A_{2ndbest}^{(0)}$ then
    if $I^{(0)} \neq I^{(1)}$ or $A^{(0)} \neq A^{(1)}$ then    { $I_F = I_F, A_F = A_F, h^{(0)} = 1$ }
    else { $I_F = I^{(0)}, A_F = A^{(0)}, h^{(0)} = 1$ }
  end if
else if { $d_{adjust} < 9$ and $v > 3$ } or $V_0 > 4$ then
  { $I_F = I^{(0)}, A_F = A^{(0)}, h^{(0)} = 1$ }
else if $V_1 > 4$ then
  { $I_F = I_{k_{2ndbest}}^{(0)}, A_F = A_{k_{2ndbest}}^{(0)}, h^{(0)} = 1$ }
else if $I^{(0)} \neq I_F$ then
  { $I_F = I_F, A_F = A_F, h^{(0)} = 1$ }
else
  { $I_F = I^{(0)}, A_F = A^{(0)}, h^{(0)} = 1$ }
  end if
else
  $h^{(0)} = 0$
end if The threshold $D_{LOWCONF-TONE}$ is set to 16 for hard-decision decoding or 30 for soft-decision decoding. The set or rules results in $h^{(0)}=1$, if a tone frame has been detected, or $h^{(0)}=0$ if a tone frame was not detected. Note that in some cases, the index and amplitude of the prior frame, $I_F$ and $A_F$, are repeated. It is better to use the values from the prior frame when the distance is low enough that it is fairly certain that the frame is a tone frame, yet the confidence is not high enough to be certain which index and amplitude were received.

If a tone frame was detected, the tone index and amplitude are passed to the tone frame reconstructor, which sets up MBE model parameters for the synthesis block. If a tone frame was not detected, the input frame of bits is passed to the FEC Decoder.

Tone Frame Detector Performance

Table 1 includes performance comparisons showing how the APCO half-rate decoder performs with and without tone frame detection for a test input that contains 100% tones with added bit errors. For each given channel condition, the percentage of frames that are bad are significantly lower when tone frame detection is enabled. At 16% bit error rate, the system with tone frame detection performs nearly as well as the decoder without tone frame detection performs at 9% bit error rate. When tone frame detection is disabled, the FEC decoder breaks down near 10% bit error rate and is unable to decode tone frames and as a consequence muting is activated.

TABLE 1

| | Percentage of Bad Frames (no tone detected or incorrect tone detected) | |
|---|---|---|
| Test Condition (Hard-Decision Decoding) | APCO half-rate decoder without Tone Frame Detection | APCO half-rate decoder with Tone Frame Detection |
| 9% BER Gaussian Channel Model | 1.242% | 0.003% |
| 10% BER Gaussian Channel Model | 36.72% | 0.032% |
| 16% BER Gaussian Channel Model | 99.72% | 1.725% |

The tone frame detector also produces significant performance improvement when soft-decision decoding is used, as shown in Table 2. It can be seen that decoding performance with or without tone frame detection is improved by soft-decision decoding. Tone frame detection combined with soft-decision decoding improves the ability to decode tones by a large margin.

TABLE 2

| | Percentage of Bad Frames (no tone detected or incorrect tone detected) | |
|---|---|---|
| Test Condition (Soft-Decision Decoding) | APCO half-rate decoder without Tone Frame Detection | APCO half-rate decoder with Tone Frame Detection |
| 9% BER Gaussian Channel Model | 0.112% | 0.0% |
| 10% BER Gaussian Channel Model | 1.322% | 0.0% |
| 16% BER Gaussian Channel Model | 99.792% | 0.093% |

Tone Frame Detector Complexity Reduction

As discussed above, a full-complexity tone frame detector computes and evaluates the distance between each received frame of bits and every possible tone index/amplitude candidate. For the 3600 bps AMBE+2™ Vocoder, tone indices 5-122 represent single frequency tones and tone indices 128-163 represent dual tones, such that there are 154 possible values for the tone index. In addition, there are 64 possible values for the 12-bit seed due to the dependence of the seed on the 6-bit MSP of the tone amplitude. As a result, the total number of candidate combinations is 9,856 (154*64).

Since the distance and confidence are computed for each candidate combination, the complexity of the tone frame detection method is proportional to the number of candidate combinations that are evaluated. The number of machine cycles required to compute the distance and confidence is roughly constant for each combination. Therefore, reducing the number of combinations evaluated would reduce the complexity of tone frame detection.

Since eliminating combinations that do not have the lowest overall distance will not affect the outcome, complexity reduction should focus on eliminating combinations that are less likely to produce the lowest total distance, as that will reduce complexity without reducing performance.

The first 24 bits of the tone frame as produced by the tone frame generator contain an extended Golay code for an input vector which is dependent on the 6-bit MSP of the tone amplitude. The code has no dependence on the tone index. With this in mind, the amplitude distance component can be evaluated for all $\dot{M}$ amplitudes. Then the $\dot{M}$ amplitudes (where M̃<M) having the lowest amplitude distance component are selected. The total distances of these M̃ amplitudes then are evaluated for each amplitude-index combination. With this approach, the complexity goes from evaluating M×N candidates to evaluating M̃×N candidates.

A reduced number of candidates results in lower complexity, but might decrease performance. To address this, the candidate elimination should be adjusted to achieve a desired tradeoff between complexity and performance. To this end, experiments using tone frame detection in the APCO Half Rate Decoder showed that the number of amplitude candidates can be reduced from M=64 to M̃=12 with only a very slight performance penalty. With this approach, the complexity reduction is (64−12)164=81.25%.

With this reduction, the partial tone frame candidates, $g_m$, contain the first 24 bits output by the tone frame generator for each possible value of the tone amplitude MSP. A set of partial distances is computed by the following equation $$d_m = \sum_{j=0}^{24} |r(j) - g_m(j)| \text{ for } 0 \leq m < 64$$

The partial distance only considers the first 24 bits of the frame corresponding to the extended Golay code. The 64 candidates for the first 24 bits of the tone frame are $g_m = TFG_{24}(m)$ for $0 \leq m < 64$ where function $TFG_{24}(A)$ is the same as function $TFG(A,I)$ except that only the first 24 bits of the tone frame are produced. Since the output of function $TFG_{24}$ does not depend on the tone index, the second argument is omitted. $g_m(j)$ denotes the jth bit of the 24-bit tone frame candidate.

After evaluating $d_m$ for $0 \leq m < 64$, the 12 amplitude candidates with the lowest distances are located. These are the most likely amplitude MSPs that were transmitted. Now the full distance over the entire 72-bit frame is evaluated for these 12 amplitudes and every possible tone index. The distance equation for the full-complexity tone frame detection method is used, except that the candidates corresponding to the least likely amplitudes are excluded. The benefit is that now instead of having to evaluate 64×154=9,856 distances, only 12×154=1,848 distances need to be evaluated.

While the techniques are described largely in the context of a MBE vocoder, the described techniques may be readily applied to other systems and/or vocoders. For example, other MBE type vocoders may also benefit from the techniques regardless of the bit rate or frame size. In addition, the techniques described may be applicable to many other speech coding systems that use a different speech model with alternative parameters (such as STC, MELP, MB-HTC, CELP, HVXC or others).

Other implementations are within the scope of the following claims.

What is claimed is:

1. A method for detecting and extracting tone data embedded in a voice bit stream that includes frames of bits, with some of the frames of bits being frames of non-tone bits and some of the frames of bits being frames of tone bits, the method comprising:
   selecting a frame of bits from the voice bit stream;
   analyzing the selected frame of bits to determine whether the selected frame of bits is a frame of tone bits; and
   when the selected frame of bits is a frame of tone bits, extracting tone data from the selected frame of bits;
   wherein analyzing the selected frame of bits comprises:
      comparing bits of the selected frame of bits to sets of tone data to produce error criteria representative of differences between the selected frame of bits and each of multiple sets of tone data,
      based on the error criteria, selecting a set of tone data that most closely corresponds to the bits of the selected frame of bits, and
      when the error criteria corresponding to the selected set of tone data satisfies a set of thresholds, designating the selected frame of bits as a frame of tone bits, and
   wherein extracting tone data from the selected frame of bits comprises providing the selected set of tone data as the extracted tone data.

2. The method of claim 1, wherein the method includes repeating the selecting and analyzing steps for each frame of bits from the voice stream, and performing the extracting step for each frame of bits determined to be a frame of tone bits.

3. The method of claim 1, wherein analyzing the selected frame of bits comprises comparing bits of the selected frame of bits to every permitted set of tone data.

4. The method of claim 1, wherein analyzing the selected frame of bits comprises comparing bits of the selected frame of bits to only a subset of every permitted set of tone data.

5. The method of claim 4, wherein:
   a set of tone data includes an amplitude component and an index component;
   analyzing the selected frame of bits comprises:
      comparing bits of the selected frame of bits corresponding to amplitude to all permitted amplitude components of the multiple sets of tone data;
      selecting a subset of the all permitted amplitude components that most closely correspond to the selected frame of bits; and
      producing error criteria by comparing bits of the selected frame of bits to all permitted combinations of the selected subset of permitted amplitude components and permitted index components.

6. The method of claim 5, wherein the index component in the set of tone data features repetitions of a tone index.

7. The method of claim 1, wherein a set of tone data includes a amplitude component and an index component.

8. The method of claim 7, wherein the index component in the set of tone data features repetitions of a tone index.

9. The method of claim 1, wherein the voice bit stream is generated by a MBE vocoder.

10. The method of claim 1, wherein the frames of non-tone bits comprise one or more of voice frames, silence frames, and data frames.

11. A speech decoder configured to detect and extract tone data embedded in a voice bit stream that includes frames of bits, with some of the frames of bits being frames of non-tone bits and some of the frames of bits being frames of tone bits, the speech decoder being operable to:
   select a frame of bits from the voice bit stream;
   analyze the selected frame of bits to determine whether the selected frame of bits is a frame of tone bits; and
   when the selected frame of bits is a frame of tone bits, extract tone data from the selected frame of bits;
   wherein the speech decoder analyzes the selected frame of bits by:
      comparing bits of the selected frame of bits to sets of tone data to produce error criteria representative of differences between the selected frame of bits and each of multiple sets of tone data, based on the error criteria, selecting a set of tone data that most closely corresponds to the bits of the selected frame of bits, and when the error criteria corresponding to the selected set of tone data satisfies a set of thresholds, designating the selected frame of bits as a frame of tone bits, and wherein the speech decoder extracts tone data from the selected frame of bits by providing the selected set of tone data as the extracted tone data.

12. The speech decoder of claim 11, wherein the speech decoder is operable to repeat the selecting and analyzing for each frame of bits from the voice stream, and to extract tone data for each frame of bits determined to be a frame of tone bits.

13. The speech decoder of claim 11, wherein the speech decoder is operable to analyze the selected frame of bits by comparing bits of the selected frame of bits to every permitted set of tone data.

14. The speech decoder of claim 11, wherein the speech decoder is operable to analyze the selected frame of bits by comparing bits of the selected frame of bits to only a subset of every permitted set of tone data.

15. The speech decoder of claim 14, wherein:
a set of tone data includes an amplitude component and an index component;
the speech decoder is operable to analyze the selected frame of bits by:
comparing bits of the selected frame of bits corresponding to amplitude to all permitted amplitude components of the multiple sets of tone data;
selecting a subset of the all permitted amplitude components that most closely correspond to the selected frame of bits; and
producing error criteria by comparing bits of the selected frame of bits to all permitted combinations of the selected subset of permitted amplitude components and permitted index components.

16. The speech decoder of claim 15, wherein the index component in the set of tone data features repetitions of a tone index.

17. The speech decoder of claim 11, wherein a set of tone data includes a amplitude component and an index component.

18. The speech decoder of claim 17, wherein the index component in the set of tone data features repetitions of a tone index.

19. The speech decoder of claim 11, wherein the voice bit stream is generated by a MBE vocoder.

20. The speech decoder of claim 11, wherein the frames of non-tone bits comprise one or more of voice frames, silence frames, and data frames.

21. A handset or mobile radio including the speech decoder of claim 11.

22. A base station or console including the speech decoder of claim 11.

23. A method for detecting and extracting non-voice data embedded in a voice bit stream that includes frames of bits, with some of the frames of bits being frames of voice bits and some of the frames of bits being frames of non-voice bits, the method comprising:
selecting a frame of bits from the voice bit stream;
analyzing the selected frame of bits to determine whether the selected frame of bits is a frame of non-voice bits; and
when the selected frame of bits is a frame of non-voice bits, extracting non-voice data from the selected frame of bits;
wherein analyzing the selected frame of bits comprises:
comparing bits of the selected frame of bits to sets of non-voice data to produce error criteria representative of differences between the selected frame of bits and each of multiple sets of non-voice data,
based on the error criteria, selecting a set of non-voice data that most closely corresponds to the bits of the selected frame of bits, and
when the error criteria corresponding to the selected set of non-voice data satisfies a set of thresholds, designating the selected frame of bits as a frame of non-voice bits, and
wherein extracting non-voice data from the selected frame of bits comprises providing the selected set of non-voice data as the extracted non-voice data.

24. The method of claim 23, wherein the method includes repeating the selecting and analyzing steps for each frame of bits from the voice stream, and performing the extracting step for each frame of bits determined to be a frame of non-voice bits.

25. The method of claim 24, wherein analyzing the selected frame of bits comprises comparing bits of the selected frame of bits to every permitted set of non-voice bits.

26. The method of claim 24, wherein analyzing the selected frame of bits comprises comparing bits of the selected frame of bits to only a subset of every permitted set of non-voice bits.

* * * * *